United States Patent
Matsuse

(10) Patent No.: US 9,244,850 B2
(45) Date of Patent: Jan. 26, 2016

(54) DEVICE FOR EXECUTING PROGRAM INSTRUCTIONS AND SYSTEM FOR CACHING INSTRUCTIONS

(71) Applicant: International Business Machines Corporation, Armonk, NY (US)

(72) Inventor: Shuhsaku Matsuse, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/674,971

(22) Filed: Nov. 13, 2012

(65) Prior Publication Data

US 2013/0132658 A1  May 23, 2013

(30) Foreign Application Priority Data

Nov. 21, 2011  (JP) .................................. 2011-254280

(51) Int. Cl.
*G06F 12/08* (2006.01)
(52) U.S. Cl.
CPC .................................. *G06F 12/0875* (2013.01)
(58) Field of Classification Search
None
See application file for complete search history.

(56) References Cited

U.S. PATENT DOCUMENTS

| 7,908,436 | B1 * | 3/2011 | Srinivasan et al. | 711/114 |
|---|---|---|---|---|
| 7,953,933 | B1 * | 5/2011 | Thaik et al. | 711/125 |
| 8,418,179 | B2 * | 4/2013 | Papakipos et al. | 718/100 |
| 2010/0115240 | A1 * | 5/2010 | Falik et al. | 712/210 |
| 2012/0197852 | A1 * | 8/2012 | Dutta et al. | 707/692 |

FOREIGN PATENT DOCUMENTS

| JP | 0535589 | A | 2/1993 |
|---|---|---|---|
| JP | 5061899 | | 3/1993 |
| JP | 5298088 | | 11/1993 |
| JP | 8069447 | | 3/1996 |
| JP | 2001084147 | | 3/2001 |
| JP | 2004171236 | | 6/2004 |
| JP | 2005122452 | | 5/2005 |
| JP | 2005149497 | A | 6/2005 |
| JP | 2007200277 | | 8/2007 |

OTHER PUBLICATIONS

Kleanthous et al. (Dynamically Detecting Cache-Content-Duplication in Instruction Caches, Feb. 1997, TR-07-03).*

(Continued)

*Primary Examiner* — Aimee Li
*Assistant Examiner* — Tracy Chan
(74) *Attorney, Agent, or Firm* — David Zwick; Steven Meyers

(57) ABSTRACT

A caching system, having a first instruction cache and second instruction cache, receives an instruction address from an instruction fetch unit. For an address resulting in a cache miss in both first cache and second cache, an instruction associated with the address is retrieved from computer memory and stored with the address in first cache. For an address resulting in a cache miss in second cache and a cache hit in first cache, the instruction associated with the address is retrieved from first cache. If no instruction in second cache matches the retrieved instruction, the retrieved instruction is stored in second cache and associated with the received address; otherwise the matching instruction is associated with the received address. For an address resulting in a cache hit in second cache, the instruction associated with the address is retrieved from second cache. The retrieved instruction is returned to the instruction fetch unit.

15 Claims, 7 Drawing Sheets

(56) References Cited

OTHER PUBLICATIONS

Kleanthous, et al., The Duplication of Content in Instruction Caches and its Performance Implications, Department of Computer Science, University of Cyprus, CS-TR-01-2005, Jan. 2005. pp. 1-14.

Kleanthous, et al., Dynamically Detecting Cache-Content Duplication in Instruction Caches, Department of Computer Science, Univetsity of Cyprus, Feb. 2007 TR-07-03, pp. 1-22.

Matsuse, "Device for Executing Program Instuctions and System for Caching Instructions," Filed on Nov. 21, 2011, p. 1-26, JP Patent Application No. 2011-254280, English Translation.

* cited by examiner

DEVICE FOR EXECUTING PROGRAM INSTRUCTIONS AND SYSTEM FOR CACHING INSTRUCTIONS

CLAIM OF PRIORITY

The present application claims the benefit of priority of JP patent application 2011-254280, entitled "Device For Executing Program Instructions and System For Caching Instructions", filed Nov. 21, 2011, with the Japanese Patent and Trademark Office, the content of which is incorporated herein by reference in its entirety.

TECHNICAL FIELD

The present invention relates to a processing device (processor) and a caching system for a processor, and more specifically to a caching system for holding (caching) instructions.

BACKGROUND ART

A cache memory is usually provided in a computer as a means of improving the processing speed. A cache memory is a memory with high access speed, and temporarily holds (caches) data loaded from the main memory. The processing device (processor) acquires data from the cache memory without accessing the main memory, which has a slower access speed, when the data to be acquired is in the cache memory.

Typically, the cache memory used by a processing device includes an instruction cache for holding program instructions and a data cache for holding data to be processed. The cache memory holds data in units called cache lines. In the case of the instruction cache, the data to be held are sequences of instructions.

However, when looking at the code size of a cache line for executable code of the instruction sequences, the same code sequence is often held multiple times. For example, save instructions in the register during a task switch and in line code are likely to be the same code sequence. As a result, the instruction cache holds the same code sequence multiple times, and a significant amount of redundancy occurs in the cache content. Examples of this issue have been further shown in "Marios Kleanthous et al., "Dynamically Detecting Cache Content Duplication in Instruction Caches", Department of Computer Science, University of Cyprus, February 2007, TR-07-03" and "Marios Kleanthous et al., "The Duplication of Content in Instruction Caches and its Performance Implications", Department of Computer Science, University of Cyprus, January 2005, CS-TR-01-2005".

SUMMARY OF INVENTION

Technical Problems

An embodiment of this invention is a device for loading and executing a program instruction including: an instruction fetch unit for loading an instruction specified by an address in the main memory; a first cache memory for holding the instruction loaded by the instruction fetch unit; a second cache memory for associating an instruction with one or more addresses in the main memory storing the instruction and for holding the associated instruction and addresses, and for specifying the instruction associated with the address on the basis of an address acquired from the instruction fetch unit; a determining unit for holding in the second cache memory any instruction among the instructions stored in the first cache memory whose loading frequency by the instruction fetch unit exceeds a predetermined threshold value; and a selecting unit for selecting the second cache memory as the loading source of the instruction when the instruction to be loaded by the instruction fetch unit is held in either the first cache memory or the second cache memory. The second cache memory associates the address specifying the instruction with an already held instruction and holds the address when the instruction specified for holding by the determining unit is the same instruction already held, and associates the instruction with an address specifying the instruction and holds the instruction and the address when the instruction specified for holding by the determining unit is not the same instruction being held. Also, the instruction at the same address as the instruction held in the second cache memory is deleted from the first cache memory. In one embodiment, the second cache memory is static random access memory (SRAM).

In order to achieve the aforementioned purpose, the present invention can also be realized as the following embodiment. This embodiment is a system for caching a program instruction including: a first caching means for specifying an address in the main memory and caching an instruction loaded from the main memory; a second caching means for caching among the instructions cached in the first caching means any instruction meeting predetermined conditions; and a selecting means for selecting the loading source of the instruction when the instruction to be loaded is cached in either the first caching means or the second caching means; and wherein the second caching means associates an instruction with one or more addresses in the main memory storing the instruction and holds the associated instruction and addresses, and specifies the instruction associated with the address on the basis of the address specified for loading the instruction. The second caching means associates an instruction with one or more addresses in the main memory storing the instruction and holds the associated instruction and addresses, and specifies the instruction associated with the address on the basis of an address acquired from the loading means.

More specifically, the second caching means associates the address specifying the instruction with an already held instruction and holds the address when the instruction to be cached is the same instruction already held, and associates the instruction with an address specifying the instruction and holds the instruction and the address when the instruction to be cached is not the same instruction being held.

Preferably, the second caching means caches any instruction among the instructions held in the first caching means whose load request hit frequency exceeds a predetermined threshold value. Preferably, the instruction at the same address as the instruction held in the second caching means is deleted from the first caching means. Preferably, the selecting unit selects for loading from the second caching means an instruction to be loaded when the instruction is held in either the first caching means or the second caching means.

The present invention is able to realize an efficient caching system which reduces redundancy of held content when instructions are held (cached) in cache memory.

DESCRIPTION OF EMBODIMENT

The following is a detailed explanation of an embodiment of the present invention with reference to the appended diagrams. The executable code for the processor, with the exception of special cases such as just in time (JIT), is not rewritten in the main memory, and allocated addresses for storing instructions are not changed. In other words, instructions are uniquely determined with respect to addresses in the main memory. On the basis of this, in this embodiment, a caching system is realized for specifying instruction sequences as macros associated with an address. In the explanation of this embodiment, the cache system using these macros is configured as an additional configuration for a cache system using a conventional instruction cache (cache memory).

Figure 1:
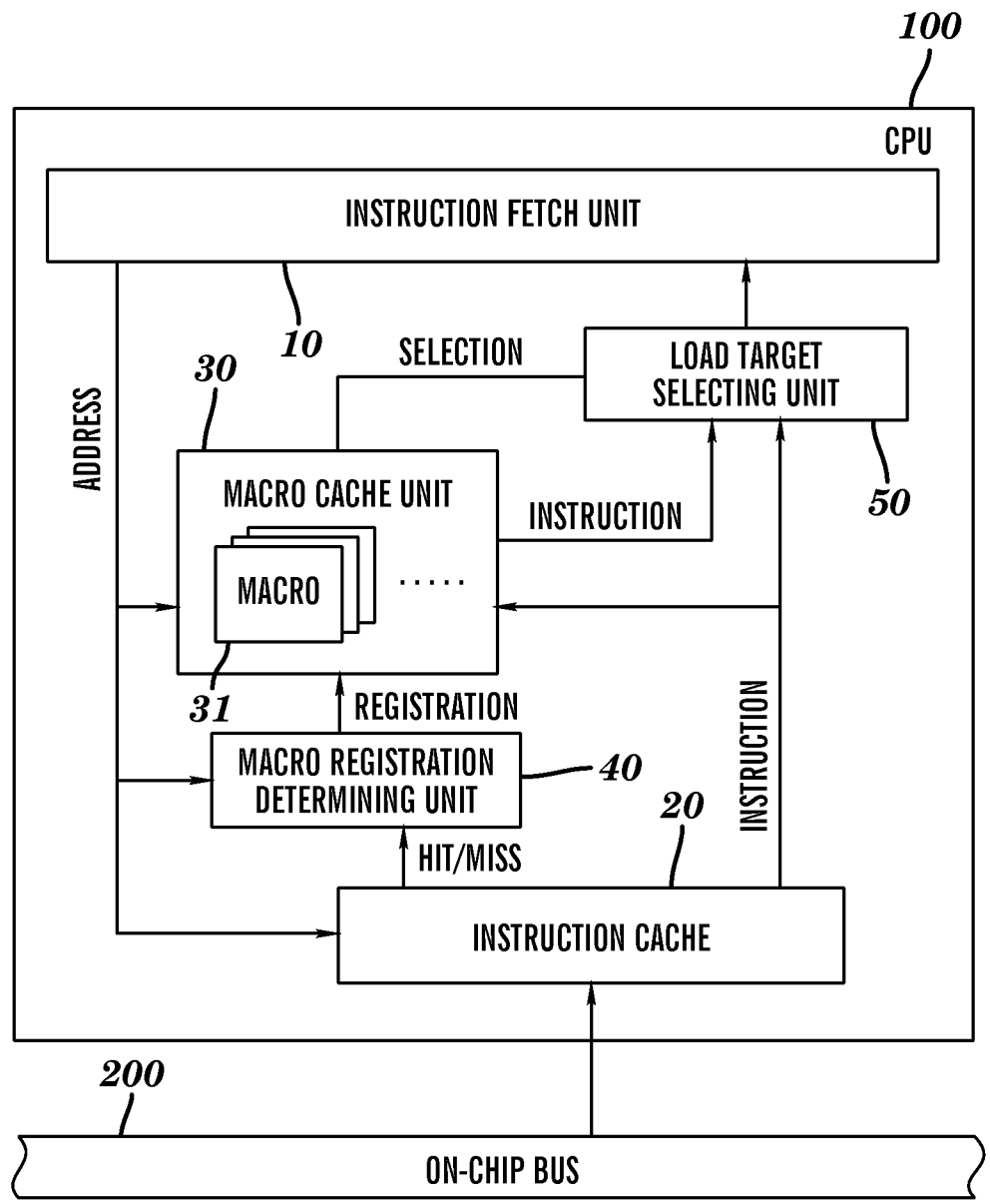
FIG. 1 is a diagram showing the configuration of the caching system in an embodiment.

FIG. 1 is a diagram showing the configuration of the caching system in this embodiment. In the configuration shown in FIG. 1, the central processing unit (CPU) 100 serving as the processing device (processor) is connected to the bus 200 on the chip (on-chip bus). The CPU 100 in this embodiment, as shown in the drawing, includes an instruction fetch unit 10, and an instruction cache 20 serving as the first caching means. The CPU 100 also has a macro cache unit 30 serving as the second caching means, a macro registration determining unit 40, and a load target selecting unit 50. Only those aspects of the configuration of the CPU 100 related to the embodiment are illustrated in FIG. 1.

The instruction fetch unit 10 loads (fetches) instructions for the CPU 100 to execute processing in a program. An instruction is acquired by specifying the address in the main memory (not shown) of the instruction to be acquired. The instruction fetch unit 10 acquires an instruction when the instruction to be acquired is either held (cached) in the instruction cache 20 or registered as a macro 31 (described below) in the macro cache unit 30 (corresponding to a cache hit). The instruction is acquired by accessing the main memory when the instruction to be acquired is in neither the instruction cache 20 nor the macro cache unit 30 (corresponding to a cache miss).

The instruction cache 20 is usually an instruction cache in the cache memory. In other words, when an instruction (instruction sequence) is loaded from the main memory for the CPU 100 to execute a process, the load instruction (instruction sequence) is held in the instruction cache 20. When the same process is next executed by the CPU 100, the instruction or instruction sequence is loaded from the instruction cache 20. The instruction cache 20 can be SRAM using content-addressable memory (CAM).

The macro cache unit 30 holds (caches) an instruction sequence to be fetched by the instruction fetch unit 10 as a macro 31 associated with the address of the instruction sequence in the main memory. A macro 31 is created for each instruction sequence to be cached. Among the instructions held in the instruction cache 20, only those instruction sequences which have been targeted for registration by the macro registration determining unit 40 are held in the macro cache unit 30. The macro cache unit 30 and macros 31 are described in greater detail below.

The macro registration determining unit 40 determines whether or not an instruction sequence held in the instruction cache 20 is to be registered in the macro cache unit 30. In this embodiment, the macro registration determining unit 40 determines whether or not an instruction sequence is to be registered in the macro cache unit 30 on the basis of the cache hit frequency of each instruction sequence in the instruction cache 20 (frequency at which the instruction sequence was loaded by the instruction fetch unit 10). The functions and operation of the macro registration determining unit 40 will be described in greater detail below.

When the same instruction sequence is held in both the instruction cache 20 and the macro cache unit 30, the load target selecting unit 50 selects a cache to be loaded between the cache 20 and the cache unit 30. In this embodiment, the instruction sequence is loaded from the macro cache unit 30 when the instruction sequence to be loaded by the instruction fetch unit 10 is held in the macro cache unit 30. More specifically, the macro cache unit 30 instructs the load target selecting unit 50 to select the load target from the macro cache unit 30 when the instruction sequence to be loaded by the instruction fetch unit 10 has been held by the macro cache unit 30.

Figure 2:
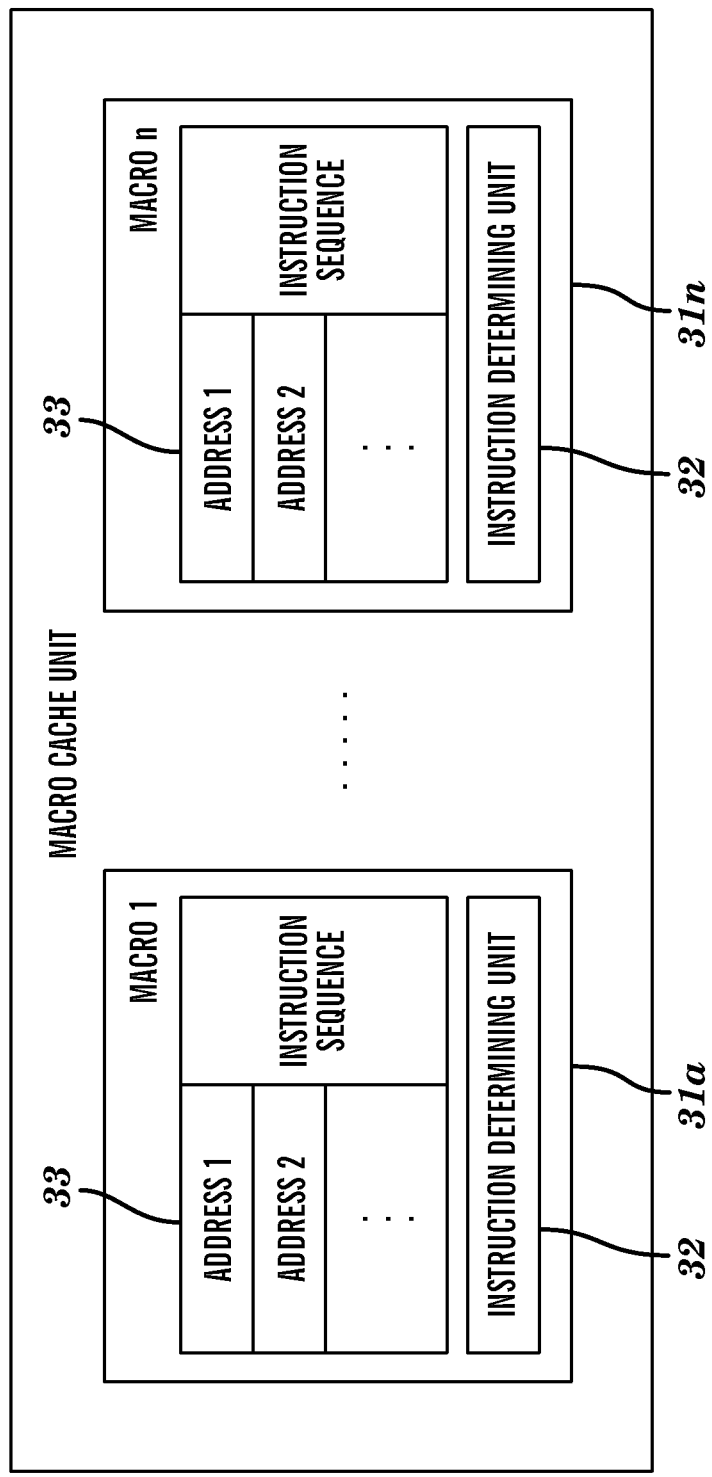
FIG. 2 is a diagram showing the configuration of the macro cache unit in this embodiment.

FIG. 2 is a diagram showing the configuration of the macro cache unit 30. As shown in FIG. 2, the macro cache unit 30 includes a plurality of macros 31a- 31n (n macros in the example shown in the drawing). Each macro 31 has a macro holding means 33 for holding a single instruction sequence and the address associated with the instruction sequence, and an instruction determining unit 32 for registering an address in the macro 31. The functions and operations of the instruction determining unit 32 will be described in greater detail below.

The macro holding means 33, as mentioned above, holds an instruction sequence and the address associated with the instruction sequence. The macro holding means is configured so that a plurality of addresses can be associated with a single instruction sequence and held. The memory means (memory) used to hold the instruction sequence and address does not have to be the content-addressable memory used in ordinary cache memory. For example, static random access memory (SRAM) can be used.

As mentioned above, an instruction sequence held in the instruction cache 20 is registered in a macro 31 when it satisfies predetermined conditions. Thus, the size of the instruction sequences held in macro holding means 33 is generally equal to the size of cache lines in an ordinary instruction cache 20. However, the size of instruction sequences that can be registered in a macro holding means 33 is not limited to this size. Instruction sequences of other sizes can be held in accordance with the specifications of the system and other factors. The number of macros 31 provided in the macro cache unit 30 and the number of addresses that can be associated with instruction sequences in the macro 31 are decided on the basis of such factors as the storage capacity of the memory means used to realize the macro holding means 33 and system specifications.

Figure 3:
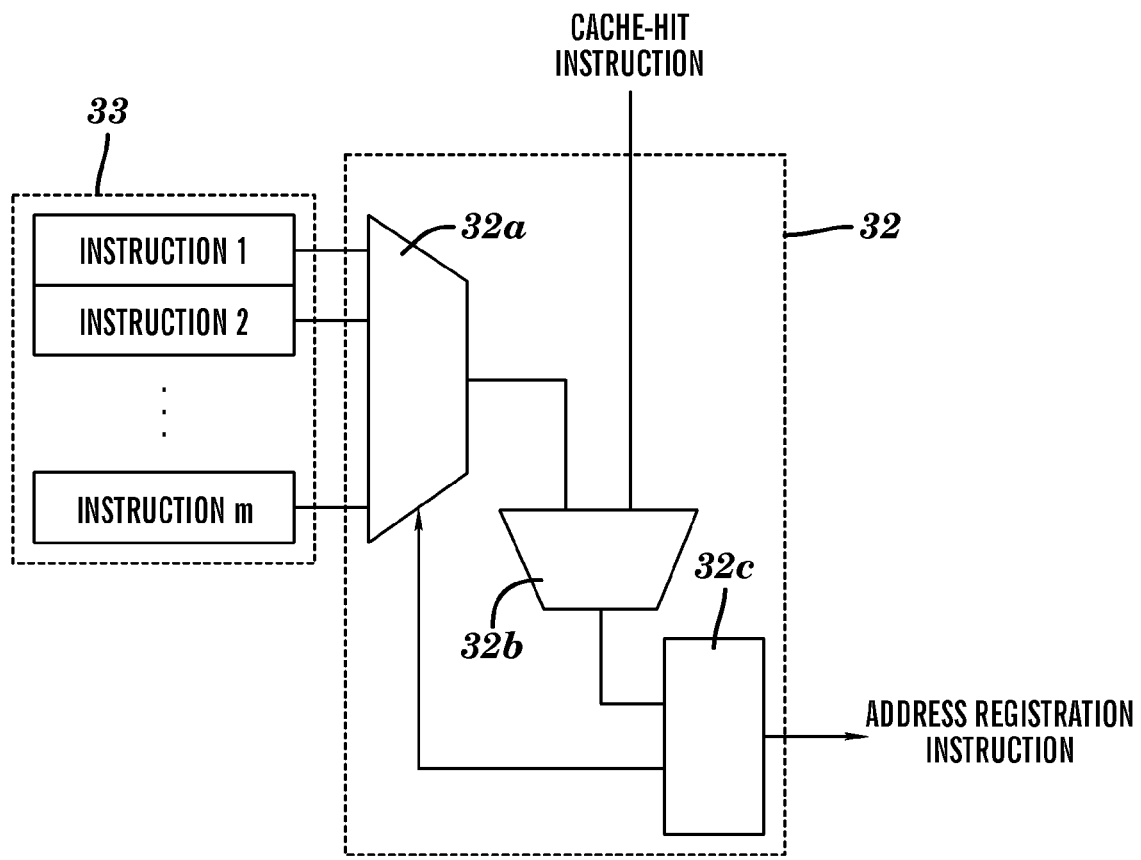
FIG. 3 is a diagram showing the configuration of the logic circuit realizing the instruction determining unit in this embodiment.

FIG. 3 is a diagram showing the configuration of the logic circuit realizing the instruction determining unit 32 in this embodiment. As shown in FIG. 3, the instruction determining unit 32 includes a selector 32a for selecting the instructions to be compared, a comparator 32b for comparing the selected instructions, and a counter 32c for counting the number of matching instructions.

The selector 32a selects an individual instruction composing an instruction sequence held in the macro holding means 33 of a macro 31 (that is, instruction units to be fetched by the instruction fetch unit 10) sequentially from the beginning for comparison by the comparator 32b.

The comparator 32b acquires the instruction sequence loaded from the instruction cache 20 by the instruction fetch unit 10, and then compares the acquired instruction sequence with instructions selected by the selector 32a.

The counter 32c counts the number of matching instructions in the comparison performed by the comparator 32b, and the total indicates to the selector 32a which instructions are to be compared. The initial value in the counter 32c is "1", and the counter counts to "m", which is the number of instructions constituting an instruction sequence registered in the macro holding means 33. For example, m=32 when an instruction code is 1 byte and the size of the cache line is 32 bytes.

Figure 4:
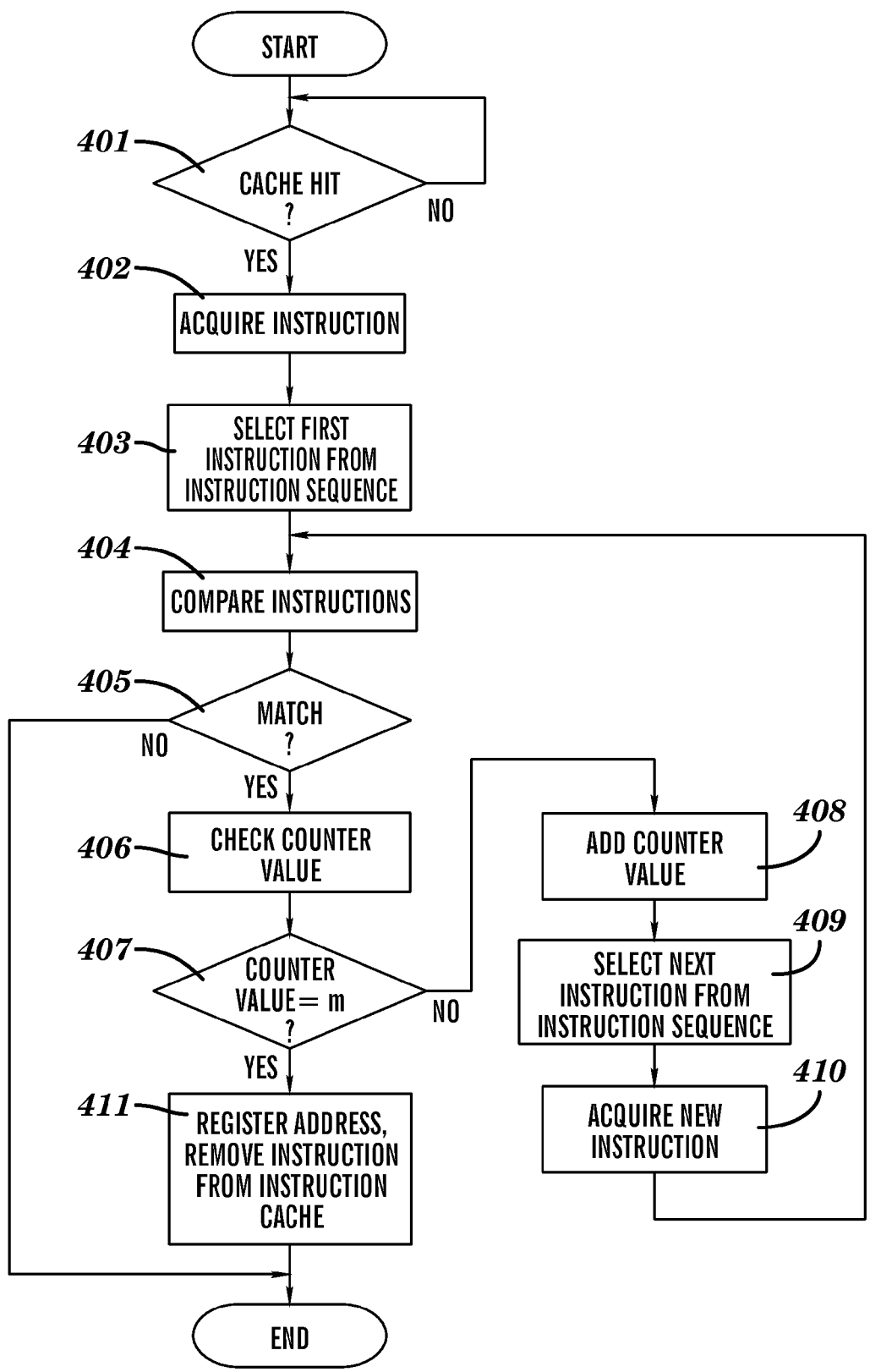
FIG. 4 is a flowchart showing the operations performed by the instruction determining unit in this embodiment.

FIG. 4 is a flowchart showing the operations performed by the instruction determining unit 32 in this embodiment. Referring to FIG. 4, the instruction determining unit 32 first acquires the instruction loaded from the instruction cache 20 when there is a hit in the instruction cache 20 for the instruction to be acquired by the instruction fetch unit 10 (Steps 401, 402). The instruction determining unit 32 then uses the selector 32a to select the first instruction in the instruction sequence held in the macro holding means 33 (Step 403). Next, the instruction determining unit 32 uses the comparator 32b to compare the instruction acquired in Step 402 with the instruction selected in Step 403 (Step 404). When the compared instructions do not match, the process is ended (Step 405).

When the instructions compared in Step 404 match, the instruction determining unit 32 checks the value of the counter 32c (Steps 405, 406). If the value of the counter 32c is not "m", the instruction determining unit 32 adds "1" to the value of the counter 32c (Steps 407, 408). Then, the instruction determining unit 32 uses the selector 32a to select the next instruction constituting the instruction sequence held in the macro holding means 33 (Step 409), and waits for the next instruction to be loaded from the instruction cache 20 (Step 410). When the next instruction is loaded from the instruction cache 20, the instruction determining unit 32 repeats the process from Step 404.

When the value of the counter 32c is "m" in Steps 406 and 407, it means the set of m instructions (instruction sequence) loaded from the instruction cache 20 matches the instruction sequence held in the macro holding means 33. Then, the instruction determining unit 32 registers in the macro holding means 33 the address of the instruction with the initial hit in the instruction cache 20 among the instructions constituting the matched instruction sequence (Steps 407, 411). Then, the instruction sequence registered in the macro holding means 33 is deleted from the instruction cache 20 (Step 411).

Figure 5:
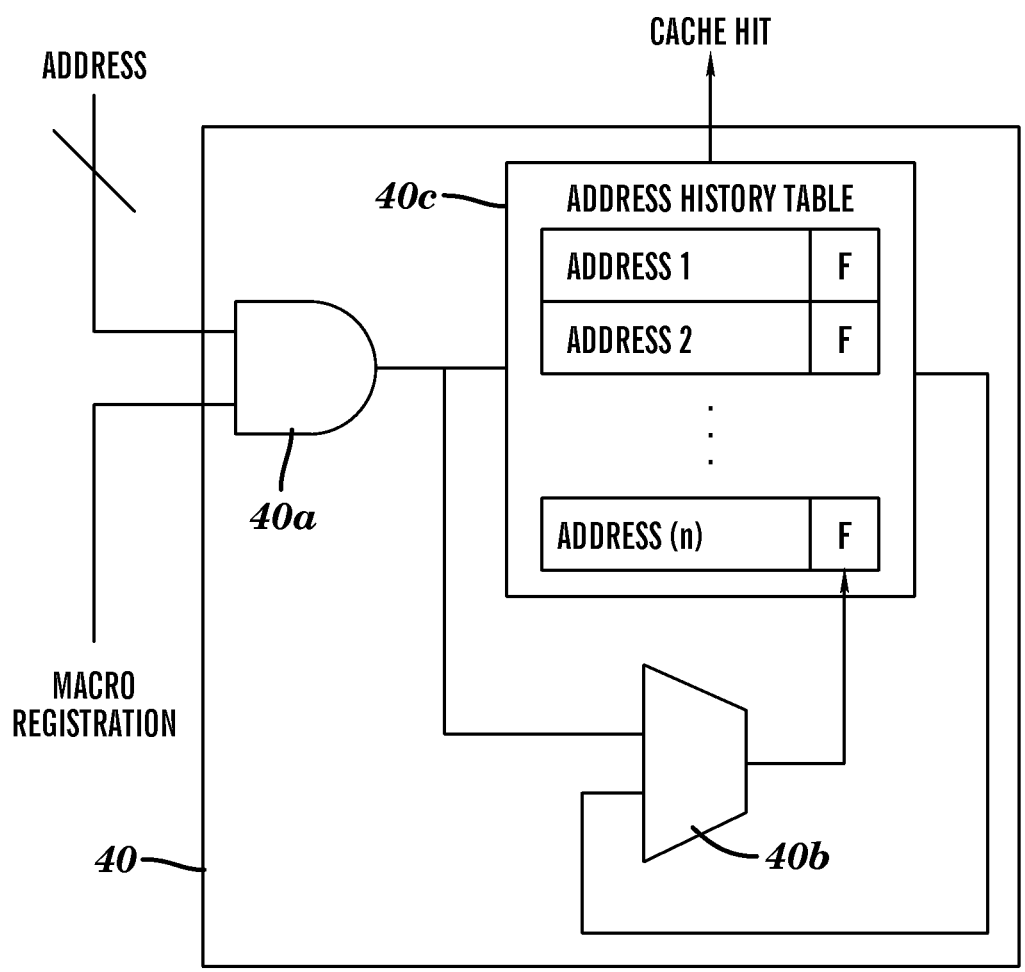
FIG. 5 is a diagram showing the configuration of the logic circuit realizing the macro registration determining unit in this embodiment.

FIG. 5 is a diagram showing the configuration of the logic circuit realizing the macro registration determining unit 40 in this embodiment. As shown in FIG. 5, the macro registration determining unit 40 includes a selector 40a for importing the address subject to determination, a comparator 40b for checking the frequency of appearance of the imported address, and an address history table 40c.

The selector 40a imports the address indicated by the instruction fetch unit 10 (that is, the address of the instruction to be acquired) when there is a hit in the instruction cache 20 for the instruction to be acquired by the instruction fetch unit 10.

The comparator 40b compares the address imported by the selector 40a with the addresses registered in the address history table 40c. When the address imported by the selector 40a is not registered in the address history table 40c, the address is registered in the address history table 40c. When the address imported by the selector 40a is registered in the address history table 40c, the comparator 40b updates the flag data ("F" in FIG. 5) indicating the number of times the address has been subjected to acquisition by the instruction fetch unit 10.

The address history table 40c is a table including addresses for instructions that the instruction fetch unit 10 previously tried to acquired, and flag data indicating the number of times an address was the subject of acquisition for the instruction fetch unit 10. When, as a result of a comparison performed by the comparator 40b, the address imported by the selector 40a is not registered in the address history table 40c, the address is registered. When, as a result of a comparison performed by the comparator 40b, the address imported by the selector 40a is already registered in the address history table 40c, "1" is added to the value of the flag data for the address (update). The address history table 40c is stored in SRAM used in common by the macro holding means 33 for the macros 31. The number of addresses that can be registered in the address history table 40c and the number of units of flag data (number of entries) are determined on the basis of such factors as the storage capacity of the memory means storing the address history table 40c and the specifications of the system.

Figure 6:
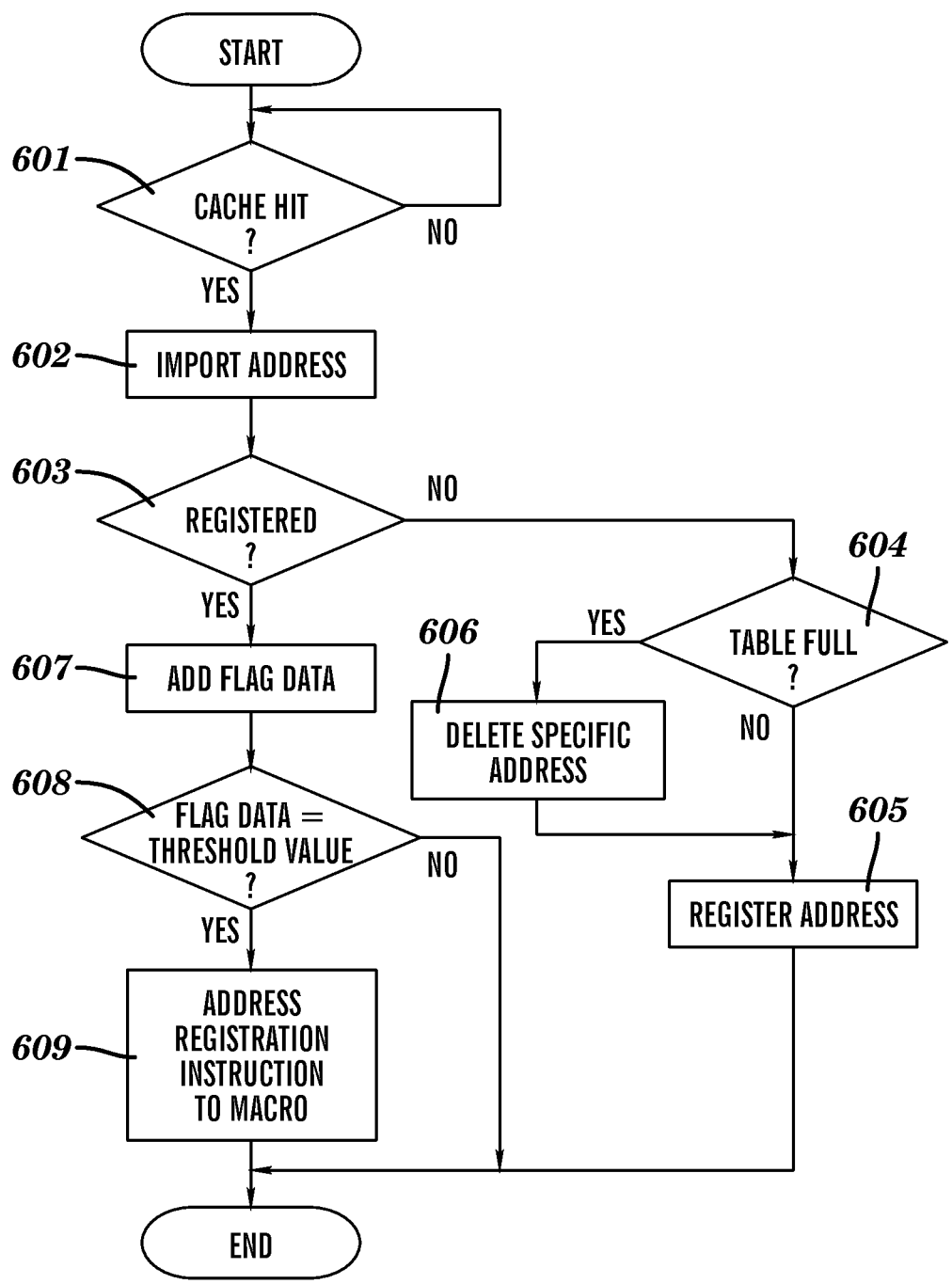
FIG. 6 is a flowchart showing the operations performed by the macro registration determining unit in this embodiment.

FIG. 6 is a flowchart showing the operations performed by the macro registration determining unit 40 in this embodiment. Referred to FIG. 6, the macro registration determining unit 40 first uses the selector 40a to import the address indicated by the instruction fetch unit 10 (the address of the instruction to be acquired) when there is a hit in the instruction cache 20 for the instruction to be acquired by the instruction fetch unit 10 (Steps 601, 602).

Next, the macro registration determining unit 40 uses the comparator 40b to determine whether or not the address acquired in Step 602 is registered in the address history table 40c (Step 603). When the address acquired in Step 602 is not registered in the address history table 40c, the macro registration determining unit 40 determines whether or not the number of addresses that can be registered in the address history table 40c has already been reached (table full) (Step 604). When there is room in the address history table 40c, the address acquired in Step 602 is registered in the address history table 40c (Step 605).

When there is no room in the address history table 40c, the macro registration determining unit 40 deletes a specific address among the addresses already registered in the address history table 40c to create a free entry in the table (Step 606). Next, the address acquired in Step 602 is registered in the address history table 40c (Step 605). The address deleted from the address history table 40c is specified in accordance with predetermined conditions, including the oldest address (the address registered first), the address that has gone the longest time without a flag data update, or an address whose flag data update frequency in a predetermined period of time after registration is less than or equal to a certain value.

When the address acquired in Step 602 is registered in the address history table 40c, the macro registration determining unit 40 adds "1" to the value of the flag data for the address (Step 607). Next, it is determined whether or not the updated value in the flag data has reached a predetermined threshold value (Step 608). Here, the threshold value is set according to such factors as the specifications of the system.

When the flag data has not reached the threshold value, the process performed by the macro registration determining unit 40 is ended, and the next cache hit in the instruction cache 20 is awaited. When the flag data has reached the threshold value, the macro registration determining unit 40 instructs the macro cache unit 30 to register the address as a macro 31 (Step 609).

When an instruction is received from the macro registration determining unit 40, the macro cache unit 30 performs the macro 31 registration process. In other words, each macro 31 is processed by the instruction determining unit 32 shown in FIG. 4. When an instruction sequence corresponding to the address subject to processing has already been registered as a macro 31, the address is additionally registered to the macro 31. When an instruction sequence corresponding to the address subject to processing has not been registered as a macro 31, a macro 31 is created for the instruction sequence.

Figure 7:
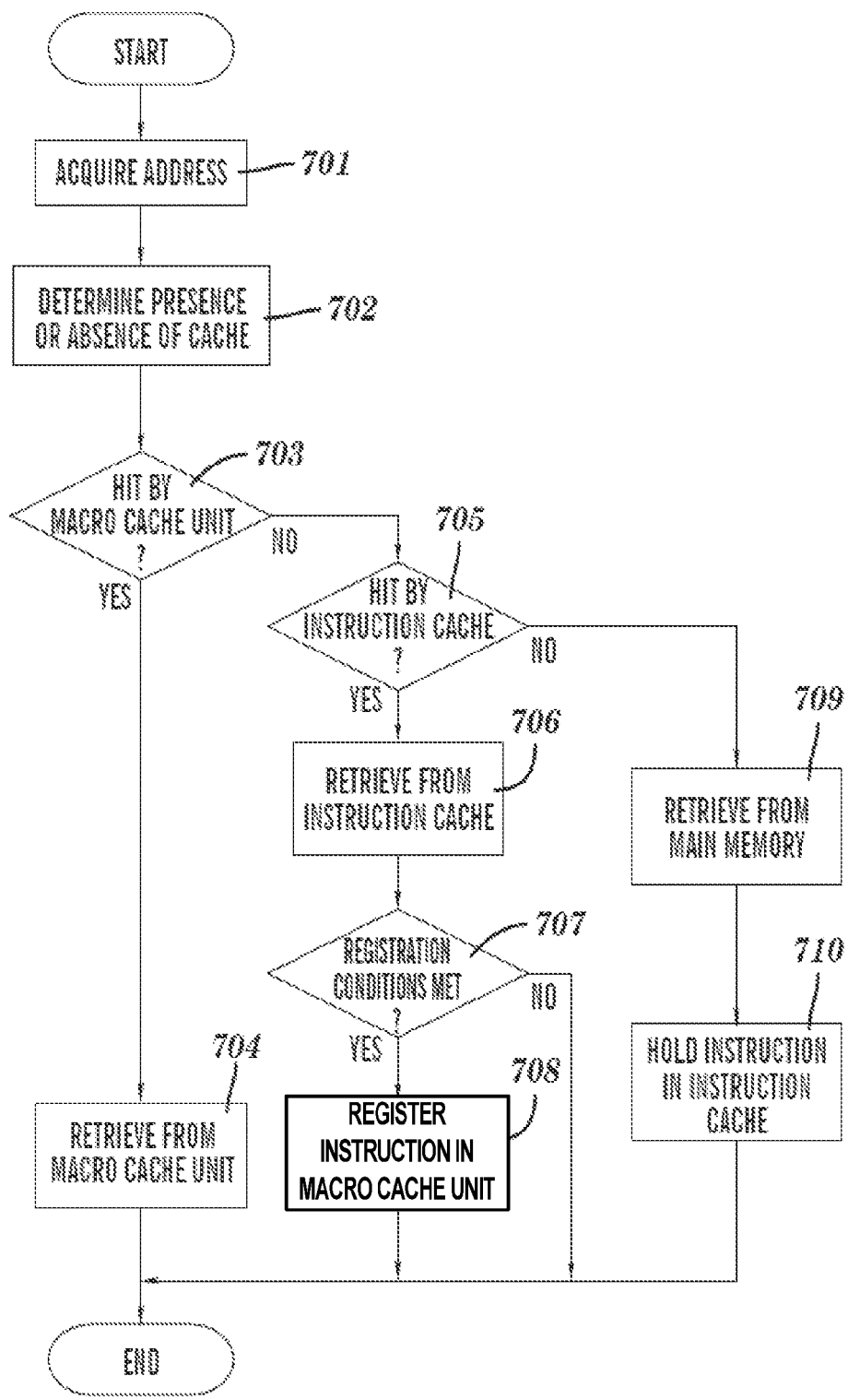
FIG. 7 is a flowchart showing the operations performed by the CPU when instructions are loaded in this embodiment.

The following is an explanation of the operations performed during instruction loading by the instruction fetch unit 10 in a CPU 100 including a cache system with the configuration described above. FIG. 7 is a flowchart showing the operations performed by the CPU 100 when instructions are loaded in this embodiment. When an instruction to be executed is loaded by the instruction fetch unit 10, the address of the instruction is specified in the main memory. This address information is supplied from the instruction fetch unit 10 to the instruction cache 20, the macro cache unit 30 and the macro registration determining unit 40. In this way, the instruction to be loaded is acquired by the instruction cache 20, the macro cache unit 30 and the macro registration determining unit 40 (Step 701).

The instruction cache 20 and the macro cache unit 30 determine whether or not the instruction to be acquired by the instruction fetch unit 10 is being held (cached) on the basis of the acquired address (Step 702). When the instruction with the acquired address is being held by the macro cache unit 30, the instruction is loaded to the instruction fetch unit 10 from the macro cache unit 30 whether or not the instruction is being held by the instruction cache 20 (Steps 703, 704). The selection is performed by the load target selecting unit 50.

When the instruction with the acquired address is not being held by the macro cache unit 30 but by the instruction cache 20, the instruction is loaded to the instruction fetch unit 10 from the instruction cache 20 (Steps 703, 705, 706). At this time, the macro registration determining unit 40 determines whether or not the instruction is to be registered in the macro cache unit 30 (see FIG. 6). When the registration conditions for the macro cache unit 30 are met (for example, the load frequency shown in Step 608 of FIG. 6), the instruction is registered to the macro cache unit 30 (Steps 707, 708). If the instruction subject to registration is an instruction that is associated with a different address and is already registered in the macro cache unit 30, the address acquired in Step 701 is additionally registered to the macro 31 in which the instruction has been registered (see FIG. 4). When the instruction subject to registration has not yet been registered to the macro cache unit 30, a new macro 31 is created for the instruction, and the address acquired in Step 701 is registered.

When the instruction to be fetched by the instruction fetch unit 10 is held in neither the macro cache unit 30 nor the instruction cache 20, the instruction fetch unit 10 accesses the main memory and imports the instruction at the specified address (Steps 703, 705, 709). When this instruction is held (cached) in the instruction cache 20 (Step 710) and is to be loaded another time by the instruction fetch unit 10, the instruction is loaded from the instruction cache 20 (Yes in Step 705).

In this embodiment, as explained above, any instruction held in the instruction cache 20 that meets predetermined requirements is registered and held in the macro cache unit 30, which is a caching means prepared separately from the instruction cache 20. The macro cache unit 30 manages the same instruction stored at different addresses in the main memory using a single macro 31 because a macro 31 can associate a single instruction with a plurality of addresses. In the instruction cache 20, the same instructions are stored separately in the conventional manner if they have different addresses. Therefore, the same address sequence stored at a plurality of addresses in the main memory is registered in the macro cache unit 30 when held in the caching system of this embodiment. This limits the amount of redundancy compared to the instruction cache 20.

Assume, for example, a case in which a 32 KB (kilobyte) instruction cache 20 is installed, and the redundancy rate of the instructions held in the instruction cache 20 (the same instruction held at different addresses as a percentage of all instructions being held) is 10%. A redundancy rate of 10% is an assumed value based on Non-patent literature 1 and 2. When the macro cache unit 30 in the embodiment is not provided, the effective cache size of the instruction cache 20 is estimated to be 28.8 KB (=32 KB×0.9). When the macro cache unit 30 in the embodiment is provided, instructions meeting predetermined requirements are registered in the macro cache unit 30 and removed from the instruction cache 20. Duplicate instruction sequences stored at different addresses are registered in a single macro 31 in the macro cache unit 30. Thus, compared to a case in which the macro cache unit 30 in the embodiment is not provided, the effective cache size of the instruction cache 20 is closer to the original storage capacity of 32 KB, and cache efficiency is improved.

In this embodiment, whether or not to register an instruction sequence in the macro cache unit 30 is determined on the basis of the loading (cache hit) frequency of an instruction held in the instruction cache 20, and macros 31 are created automatically. Therefore, instruction sequences with a high reuse rate can be recorded as macros 31 and the cache efficiency can be further improved compared to an instruction cache 20 that holds instructions as soon as they are read from the main memory and conventional caching systems.

Because the macro cache unit 30 in this embodiment holds instruction sequences using a different mechanism that the instruction cache 20, a tag system used by content-addressable memory (CAM) ordinarily used as cache memory, is not required. Instead, the macro cache unit can be realized using an ordinary SRAM. This holds down costs (expenses) compared to a situation in which the storage capacity of the cache memory is simply increased.

An embodiment was described above, but the technical scope of the present invention is not limited to the scope described in the embodiment. It should be clear that various modifications and improvements can be added to the embodiment, and that they are included in the technical scope of the present invention and in the scope of the claims. For example, in the embodiment, when an instruction sequence is registered in the macro cache unit 30, the corresponding instruction sequence is deleted immediately from the instruction cache 20. However, the instruction sequence does not have to be deleted immediately. Instead, it can be deleted at a predetermined time following registration in the macro cache unit 30.

The invention claimed is:

1. A method for reducing instruction cache duplication for frequently fetched instructions, a caching system having a first instruction cache and a second instruction cache, the caching system coupled to a computer instruction fetch unit, the method comprising:
    receiving, by the caching system from the computer instruction fetch unit, an instruction address;
    based on the received instruction address resulting in a cache miss in both the first instruction cache and the second instruction cache:
        retrieving, by the caching system, an instruction associated with the received instruction address from a computer memory;
        storing, by the caching system, the received instruction address and the associated retrieved instruction in the first instruction cache; and
        initializing, by the caching system, a fetch frequency value for the received instruction address;
    based on the received instruction address resulting in a cache miss in the second instruction cache and resulting in a cache hit in the first instruction cache:
        incrementing, by the caching system, the fetch frequency value for the received instruction address;
        retrieving, by the caching system, the instruction associated with the received instruction address from the first instruction cache;
        determining, by the caching system, whether an instruction in the second instruction cache matches the instruction retrieved from the first instruction cache;
        based on no instructions in the second instruction cache matching the instruction retrieved from the first instruction cache and based on the fetch frequency value for the received instruction address exceeding a predetermined threshold:
            storing, by the caching system, the instruction retrieved from the first instruction cache in the second instruction cache; and
            storing, by the caching system, an association of the received instruction address to the instruction stored in the second instruction cache;
        based on an instruction in the second instruction cache matching the instruction retrieved from the first instruction cache:
            storing, by the caching system, an association of the received instruction address to the instruction stored in the second instruction cache that matches the instruction retrieved from the first instruction cache;
    based on the received instruction address resulting in a cache hit in the second instruction cache, retrieving, by the caching system, the instruction associated with the received instruction address from the second instruction cache; and
    returning, by the caching system, the retrieved instruction to the instruction fetch unit.

2. The method according to claim 1, wherein storing, by the caching system, the instruction retrieved from the first instruction cache in the second instruction cache further comprises deleting the instruction retrieved from the first instruction cache from the first instruction cache.

3. The method according to claim 1, wherein the second instruction cache comprises one or more tables, each table comprising one or more instructions retrieved from the first instruction cache.

4. The method according to claim 3, wherein the table in the second instruction cache further includes the association of the one or more instruction addresses with the one or more instructions.

5. The method according to claim 1, wherein the second instruction cache is static random access memory (SRAM).

6. A computer program product for reducing instruction cache duplication for frequently fetched instructions in a caching system having a first instruction cache, a second instruction cache, the caching system coupled to a computer instruction fetch unit, the computer program product comprising non-transitory computer readable memory and logic stored in the computer readable memory, the logic comprising:
    logic to receive, by the caching system from the instruction fetch unit, an instruction address;
    based on the received instruction address resulting in a cache miss in both the first instruction cache and the second instruction cache:
        logic to retrieve, by the caching system, an instruction associated with the received instruction address from a computer memory;
        logic to store, by the caching system, the received instruction address and the associated retrieved instruction in the first instruction cache; and
        logic to initialize, by the caching system, a fetch frequency value for the received instruction address;
    based on the received instruction address resulting in a cache miss in the second instruction cache and resulting in a cache hit in the first instruction cache:
        logic to increment, by the caching system, the fetch frequency value for the received instruction address;
        logic to retrieve, by the caching system, the instruction associated with the received instruction address from the first instruction cache;
        logic to determine, by the caching system, whether an instruction in the second instruction cache matches the instruction retrieved from the first instruction cache;
        based on no instructions in the second instruction cache matching the instruction retrieved from the first instruction cache and based on the fetch frequency value for the received instruction address exceeding a predetermined threshold:
            logic to store, by the caching system, the instruction retrieved from the first instruction cache in the second instruction cache; and
            logic to store, by the caching system, an association of the received instruction address to the instruction stored in the second instruction cache;
        based on an instruction in the second instruction cache matching the instruction retrieved from the first instruction cache:
            logic to store, by the caching system, an association of the received instruction address to the instruction stored in the second instruction cache that matches the instruction retrieved from the first instruction cache;
    based on the received instruction address resulting in a cache hit in the second instruction cache, logic to retrieve, by the caching system, the instruction associated with the received instruction address from the second instruction cache; and
    logic to return, by the caching system, the retrieved instruction to the instruction fetch unit.

7. The computer program product according to claim 6, wherein logic to store, by the caching system, the instruction retrieved from the first instruction cache in the second instruction cache further comprises logic to delete the instruction retrieved from the first instruction cache from the first instruction cache.

8. The computer program product according to claim 6, wherein the second instruction cache comprises one or more tables, each table comprising one or more instructions retrieved from the first instruction cache.

9. The computer program product according to claim 8, wherein the table in the second instruction cache further includes the association of the one or more instruction addresses with the one or more instructions.

10. The computer program product according to claim 6, wherein the second instruction cache is static random access memory (SRAM).

11. A computer system for reducing instruction cache duplication for frequently fetched instructions, the computer system comprising a caching system having a first instruction cache and a second instruction cache, the caching system coupled to a computer instruction fetch unit and configured to perform logic, the logic comprising:
  logic to receive, by the caching system from the instruction fetch unit, an instruction address;
  based on the received instruction address resulting in a cache miss in both the first instruction cache and the second instruction cache:
    logic to retrieve, by the caching system, an instruction associated with the received instruction address from a computer memory;
    logic to store, by the caching system, the received instruction address and the associated retrieved instruction in the first instruction cache; and
    logic to initialize, by the caching system, a fetch frequency value for the received instruction address;
  based on the received instruction address resulting in a cache miss in the second instruction cache and resulting in a cache hit in the first instruction cache:
    logic to increment, by the caching system, the fetch frequency value for the received instruction address:
    logic to retrieve, by the caching system, the instruction associated with the received instruction address from the first instruction cache;
    logic to determine, by the caching system, whether an instruction in the second instruction cache matches the instruction retrieved from the first instruction cache;
    based on no instructions in the second instruction cache matching the instruction retrieved from the first instruction cache and based on the fetch frequency value for the received instruction address exceeding a predetermined threshold:
      logic to store, by the caching system, the instruction retrieved from the first instruction cache in the second instruction cache; and
      logic to store, by the caching system, an association of the received instruction address to the instruction stored in the second instruction cache;
    based on an instruction in the second instruction cache matching the instruction retrieved from the first instruction cache:
      logic to store, by the caching system, an association of the received instruction address to the instruction stored in the second instruction cache that matches the instruction retrieved from the first instruction cache;
  based on the received instruction address resulting in a cache hit in the second instruction cache, logic to retrieve, by the caching system, the instruction associated with the received instruction address from the second instruction cache; and
  logic to return, by the caching system, the retrieved instruction to the instruction fetch unit.

12. The computer system according to claim 11, wherein logic to store, by the caching system, the instruction retrieved from the first instruction cache in the second instruction cache further comprises logic to delete the instruction retrieved from the first instruction cache from the first instruction cache.

13. The computer system according to claim 11, wherein the second instruction cache comprises one or more tables, each table comprising one or more instructions retrieved from the first instruction cache.

14. The computer system according to claim 13, wherein the table in the second instruction cache further includes the association of the one or more instruction addresses with the one or more instructions.

15. The computer system according to claim 11, wherein the second instruction cache is static random access memory (SRAM).

* * * * *